(12) United States Patent
Pai et al.

(10) Patent No.: US 11,718,245 B2
(45) Date of Patent: Aug. 8, 2023

(54) NOISE MITIGATION HOOD

(71) Applicant: CNH Industrial America LLC, New Holland, PA (US)

(72) Inventors: Suresh Pai, Naperville, IL (US); Panos Tamamidis, Northbrook, IL (US); Bin Lou, Bolingbrook, IL (US); Samrendra Singh, Bolingbrook, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/388,868

(22) Filed: Jul. 29, 2021

(65) Prior Publication Data

US 2023/0035658 A1 Feb. 2, 2023

(51) Int. Cl.
*B60R 13/08* (2006.01)
(52) U.S. Cl.
CPC .......... *B60R 13/0838* (2013.01); *B60R 13/08* (2013.01)
(58) Field of Classification Search
CPC ................................................. B60R 13/0838
USPC ........................................................ 181/200
See application file for complete search history.

(56) References Cited

U.S. PATENT DOCUMENTS

| 3,982,600 | A | 9/1976 | Gerresheim et al. |
| 4,121,683 | A | 10/1978 | Kohriyama |
| 4,341,277 | A | 7/1982 | Adamson et al. |
| 6,662,892 | B2 | 12/2003 | Falk et al. |
| 7,131,422 | B2 | 11/2006 | Kimura et al. |
| 7,143,852 | B2 | 12/2006 | Yatsuda et al. |
| 9,133,615 | B2 | 9/2015 | Bischoff et al. |
| 2005/0210779 | A1* | 9/2005 | Koa ................. B60J 5/0416 52/204.1 |
| 2016/0076443 | A1* | 3/2016 | Sei ................... F02B 77/13 123/198 E |

FOREIGN PATENT DOCUMENTS

| DE | 10025826.6 B4 | 11/2000 |
| FR | 2927590 A1 | 8/2009 |
| WO | WO-99/01314 | 1/1999 |
| WO | WO-2008/018821 A1 | 2/2008 |

* cited by examiner

*Primary Examiner* — Yi-Kai Wang
(74) *Attorney, Agent, or Firm* — Rickard DeMille; Rebecca Henkel (57) ABSTRACT

Systems and apparatuses include a hood for a machine including a noise inhibitor housing inhibiting transmission of noise in a horizontal plane from the machine, and a noise diffusive panel supported by the noise inhibitor housing and structured to release noise upward.

20 Claims, 7 Drawing Sheets

NOISE MITIGATION HOOD

BACKGROUND

The present disclosure relates generally to machinery hoods. More specifically, the present disclosure relates to noise mitigation for vehicle hoods.

SUMMARY

One embodiment relates to a hood for a machine including a noise inhibitor housing inhibiting transmission of noise in a horizontal plane from the machine, and a noise diffusive panel supported by the noise inhibitor housing and structured to release noise upward.

Another embodiment relates to a noise mitigation hood for a vehicle that includes a noise inhibitor housing inhibiting transmission of noise in a horizontal plane into a cab of the vehicle and outward from the vehicle and including noise directive contours structured to provide internal reflection of acoustic frequencies and a noise transmission inhibitor structured to absorb noise or inhibit vibration and act as a reflective noise barrier, and a noise diffusive panel supported by the noise inhibitor housing, structured to release noise upward, and including a skin supported by a support structure.

Still another embodiment relates to a vehicle that includes a frame, a prime mover supported by the frame, tractive elements selectively driven by the prime mover, a cab supported by the frame, and a noise mitigation hood positioned at least partially above the prime mover. The noise mitigation hood includes a noise inhibitor housing inhibiting transmission of noise in a horizontal plane into the cab of the vehicle and outward from the vehicle and including noise directive contours structured to provide internal reflection of acoustic frequencies and a noise transmission inhibitor structured to absorb noise or inhibit vibration and act as a reflective noise barrier, and a noise diffusive panel supported by the noise inhibitor housing, structured to release noise upward, and including a plastic skin equal to or less than one millimeter (1 mm) in thickness supported by a support structure.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Following Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, noise mitigation hoods of the present disclosure inhibit noise from being transmitted in a horizontal plane about a vehicle and encourage noise transmission vertically upward out of the noise mitigation hood. Noise can be inhibited from transmitting horizontally using internal reflection, contours, and noise mitigating materials. Noise can be encouraged to propagate upward using thin skins, specifically shaped louvers, horn elements utilizing directional speaker shaping, perforated mesh support structures, and other noise conductive structures and/or features. The propagation of noise upward, reduces the level of noise perceptible in the horizontal plane either within a vehicle cab or outside the vehicle (e.g., at ground level).

Overall Vehicle

Figure 1:
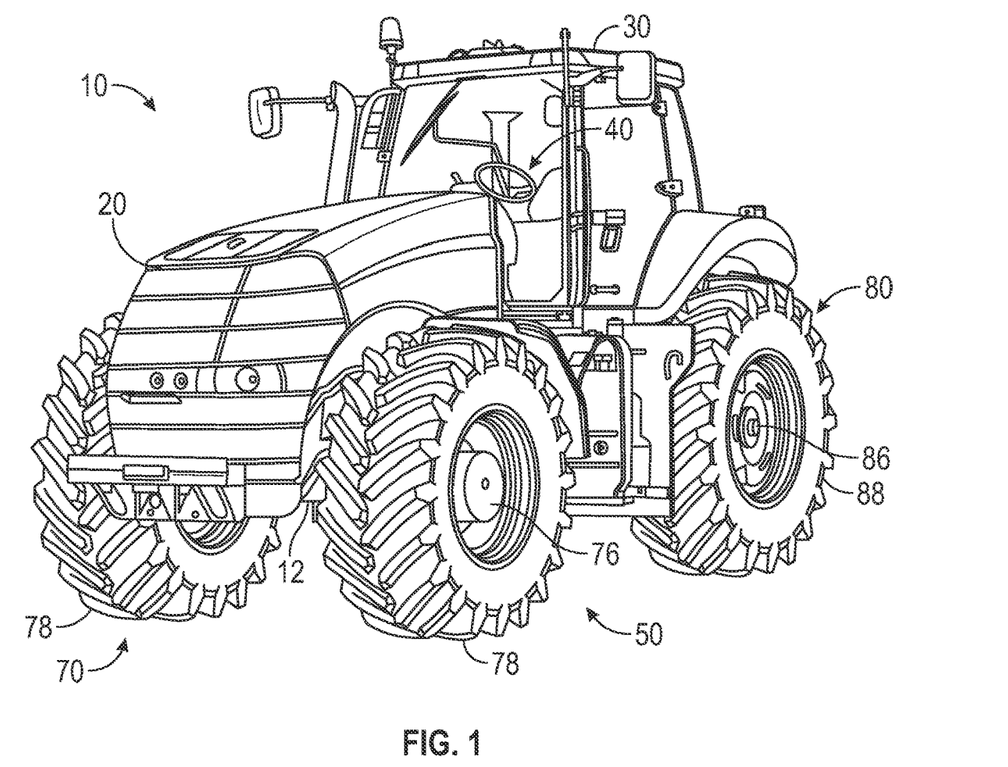
FIG. 1 is a perspective view of a vehicle, according to an exemplary embodiment.
Figure 2:
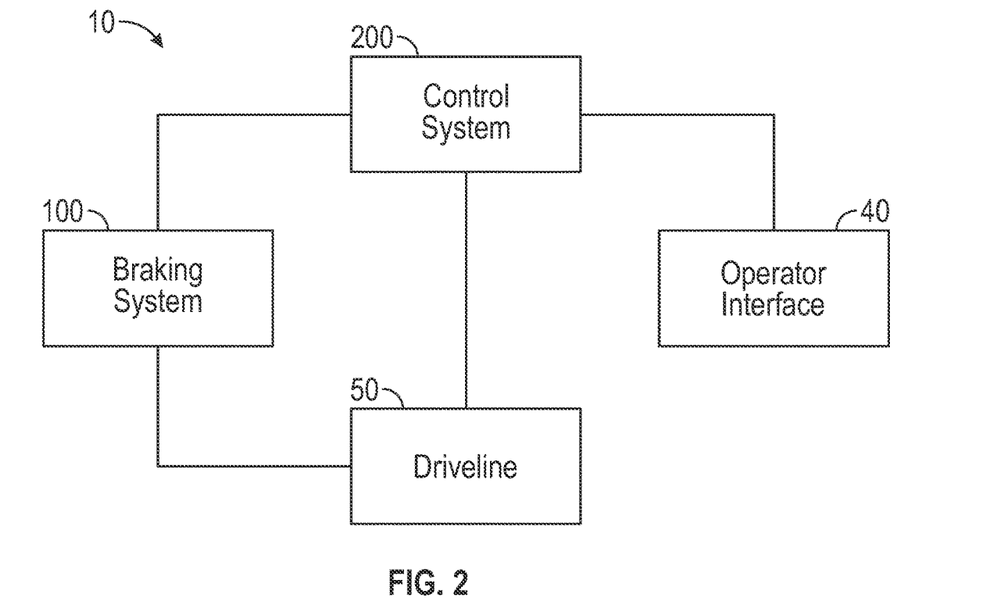
FIG. 2 is a schematic block diagram of the vehicle of FIG. 1, according to an exemplary embodiment.
Figure 3:
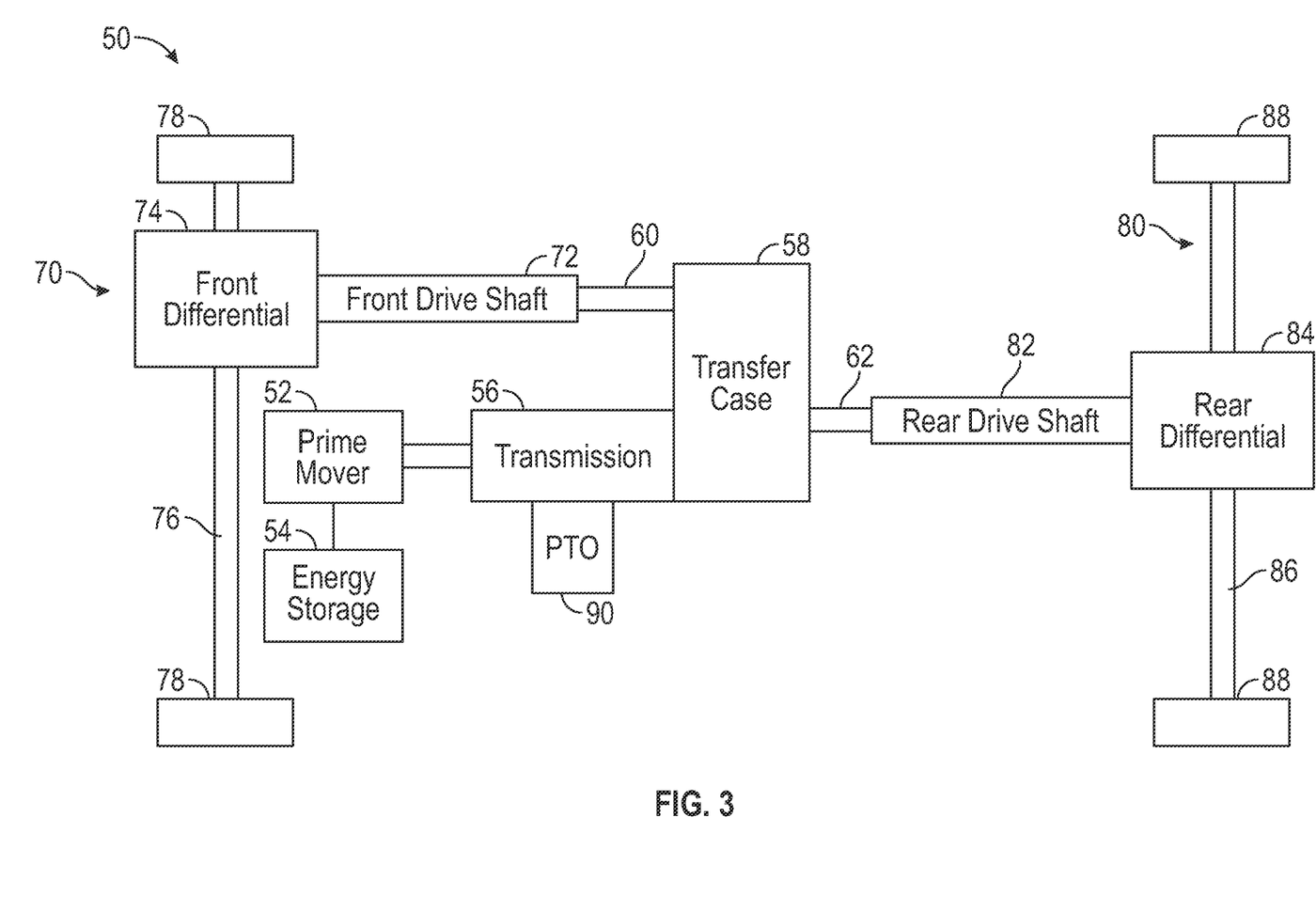
FIG. 3 is a schematic block diagram of a driveline of the vehicle of FIG. 1, according to an exemplary embodiment.

According to the exemplary embodiment shown in FIGS. 1-3, a machine or vehicle, shown as vehicle 10, includes a chassis, shown as frame 12; a body assembly, shown as body 20, coupled to the frame 12 and having an occupant portion or section, shown as cab 30; operator input and output devices, shown as operator interface 40, that are disposed within the cab 30; a drivetrain, shown as driveline 50, coupled to the frame 12 and at least partially disposed under the body 20; a vehicle braking system, shown as braking system 100, coupled to one or more components of the driveline 50 to facilitate selectively braking the one or more components of the driveline 50; and a vehicle control system, shown as control system 200, coupled to the operator interface 40, the driveline 50, and the braking system 100. In other embodiments, the vehicle 10 includes more or fewer components.

According to an exemplary embodiment, the vehicle 10 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 10 includes one or more attached implements and/or trailed implements such as a front mounted mower, a rear mounted mower, a trailed mower, a tedder, a rake, a baler, a plough, a cultivator, a rotavator, a tiller, a harvester, and/or another type of attached implement or trailed implement.

According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, a LCD display, a LED display, a speedometer, gauges, warning lights, etc. The one or more input device may be or include a steering wheel, a joystick, buttons, switches, knobs, levers, an accelerator pedal, a brake pedal, etc.

According to an exemplary embodiment, the driveline 50 is configured to propel the vehicle 10. As shown in FIG. 3, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 includes a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle).

As shown in FIGS. 1 and 3, the front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements, shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIGS. 1 and 3, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.). The rear axle 86 may include one or more components. According to the exemplary embodiment shown in FIG. 1, the front tractive elements 78 and the rear tractive elements 88 are structured as wheels. In other embodiments, the front tractive elements 78 and the rear tractive elements 88 are otherwise structured (e.g., tracks, etc.). In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

As shown in FIG. 3, the driveline 50 includes a power-take-off ("PTO"), shown as PTO 90. While the PTO 90 is shown as being an output of the transmission 56, in other embodiments the PTO 90 may be an output of the prime mover 52, the transmission 56, and/or the transfer case 58. According to an exemplary embodiment, the PTO 90 is configured to facilitate driving an attached implement and/or a trailed implement of the vehicle 10. In some embodiments, the driveline 50 includes a PTO clutch positioned to selectively decouple the driveline 50 from the attached implement and/or the trailed implement of the vehicle 10 (e.g., so that the attached implement and/or the trailed implement is only operated when desired, etc.).

According to an exemplary embodiment, the braking system 100 includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system 100 may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one more tractive elements (e.g., wheels, etc.) of the trailed implement.

Noise Mitigation Hood

Machinery, such as the vehicle 10, can include a prime mover 52 and other driveline 50 components that generate noise. As machinery increases in size or power requirements, the corresponding prime mover 52 also increases in size and/or power output capacity. Increased size and power capacity of the driveline 50 often results in increased noise produced by the driveline 50. For example, engines with a displacement of sixteen liters produce high decibel noise that can be undesirable.

It is desirable to reduce to noise levels experienced by an operator of machinery (e.g., in a cab 30 of vehicle 10) and other individuals positioned adjacent the machinery (e.g., working next to the machinery). Embodiments described herein relate to a noise mitigation hood that provide directional noise control to direct noise vertically upward and mitigate noise travelling horizontally into the cab 30 or outward of the machinery in a substantially horizontal direction toward adjacent spaces. The direction of noise vertically reduces the noise decibel levels experienced at ground level and within the cab 30 of the machinery. Reference will be made below to a hood for a vehicle 10, such as a tractor, but are also applicable to other types of vehicles, and other types of machinery. For example, trailerable machinery, generator sets, air compressors, skid steers, skid loaders, wheel loaders, and other machinery in contemplated within this disclosure.

The noise mitigation hood releases noise that builds up under the hood in an upwards direction, away from the cab 30 and/or any pedestrian on the ground. The directional control of noise generated within the noise mitigation hood reduces the perceived drive-by noise. By allowing a majority of the sound energy to dissipate towards the sky, the overall noise level reaching an operator within the cab 30 and any person on the ground is mitigated.

During operation of machinery, the prime mover 52 and cooling fan run at a high operating speed and created significant noise. The noise builds up under the noise mitigation hood and exits primarily through any open sections (e.g., gaps, apertures, etc.). Typically, a substantial portion of the generated noise reaches the cab 30 firewall, floor, and front windshield which is then transmitted in to the cab 30 and to the operator. Hood side openings increase the drive-by noise. By controlling the release of noise skywards, overall noise levels perceived by operators and people on ground level can be significantly reduced.

In some embodiments, an upper part of the noise mitigation hood can be made of a material which allows noise to diffuse therethrough, preventing any buildup and/or amplification of the noise in an underhood region (e.g., engine bay or compartment). A diffusive hood material can include low density material, light material, or perforated material binding a solid thin top layer. It is also desirable to avoid releasing the noise too close to the cab 30. Depending upon the noise source (e.g., prime mover 52, fan, etc.), the area or section of a noise diffusive panel or more than one noise diffusive panels of the noise mitigation hood can vary. For example, a large generator set may include a relatively larger noise diffusive surface while a medium sized tractor may include a relatively smaller noise diffusive surface.

Figure 4:
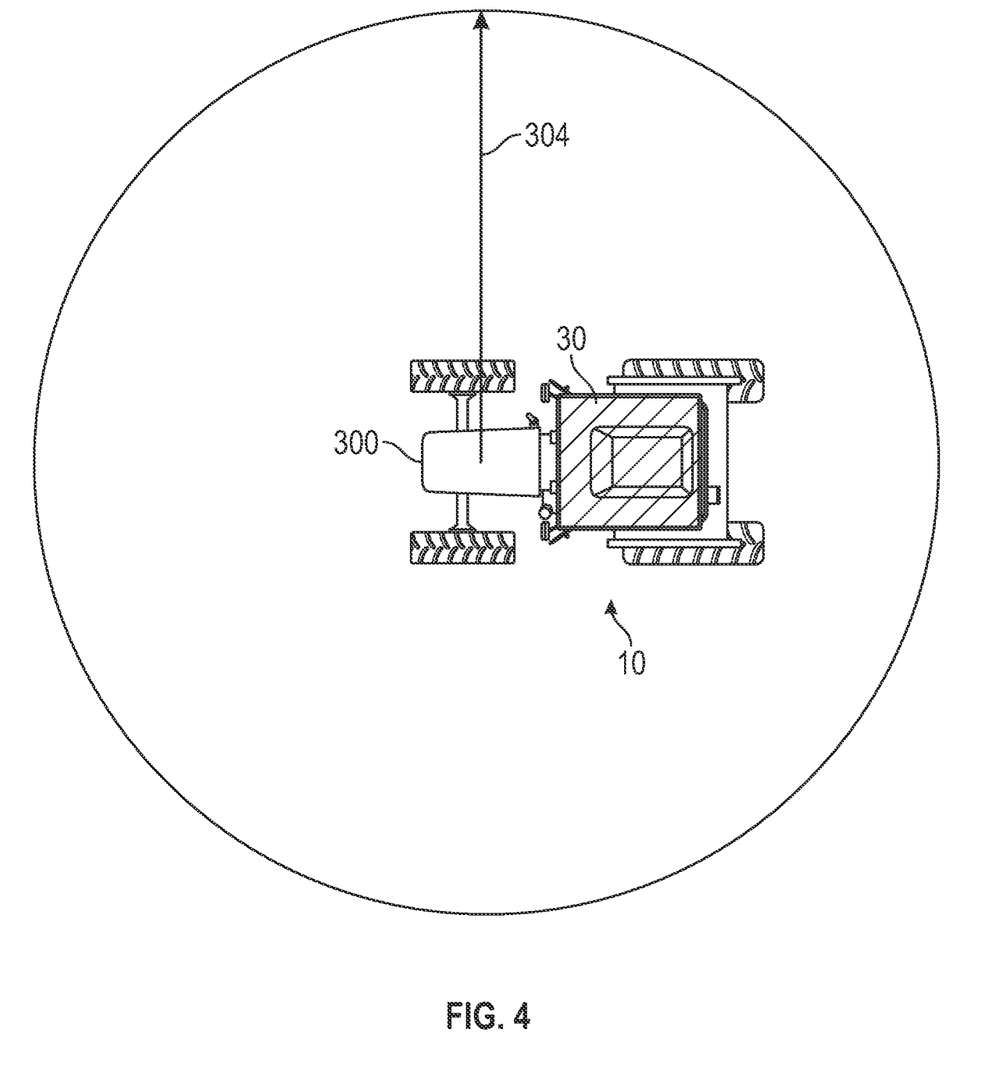
FIG. 4 is a top view of the vehicle of FIG. 1, according to an exemplary embodiment.

As shown FIG. 4, a noise mitigation hood 300 is structured to reduce noise levels within the cab 30 and on a horizontal plane outside the vehicle 10 to below a threshold noise level. In some embodiments, the threshold noise level is defined by a regulatory or standard setting entity (e.g., OSHA). In some embodiments, the threshold noise level is eighty-five decibels (85 dB). In some embodiments, the threshold noise level is determined at a noise level distance 304 defined as a radius distance from the vehicle 10 on the horizontal plane. For example, the threshold noise level may be defined as eighty-five decibels at three meters (3 m). In some embodiments, the threshold noise level is defined within the cab 30 (e.g., eighty five decibels at any location within the cab 30).

Figure 5:
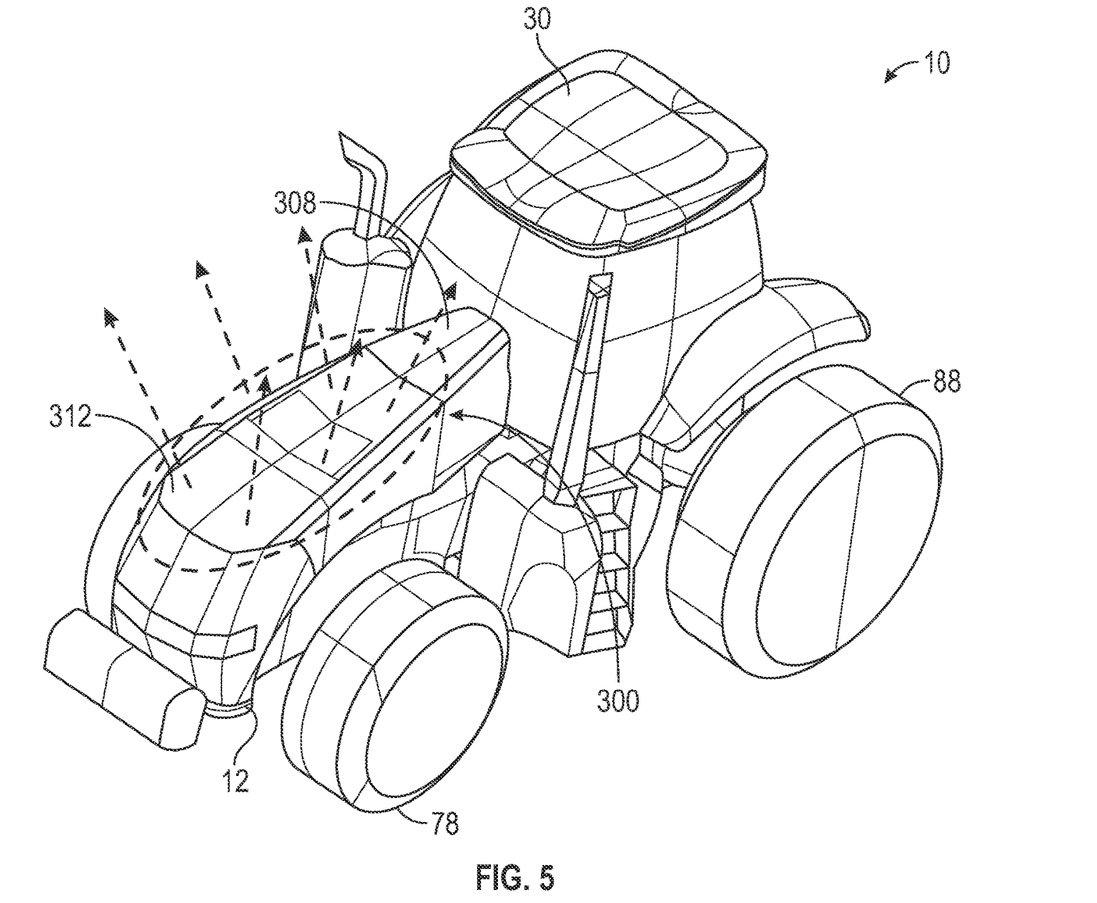
FIG. 5 is a perspective view of the vehicle of FIG. 1 including a noise mitigation hood, according to an exemplary embodiment.

As shown in FIG. 5, the noise mitigation hood 300 is coupled to the frame 12 of the vehicle 10 and is selectively movable to provide access to a hood compartment that is structures in some embodiments to support an engine or other prime mover 52 and other driveline 50 components and/or other vehicle components. In some embodiments, the noise mitigation hood 300 is pivotable relative to the frame 12, or wholly removable from the frame 12. The noise mitigation hood 300 includes a noise inhibitor housing 308 and a noise diffusive panel 312.

Figure 6:
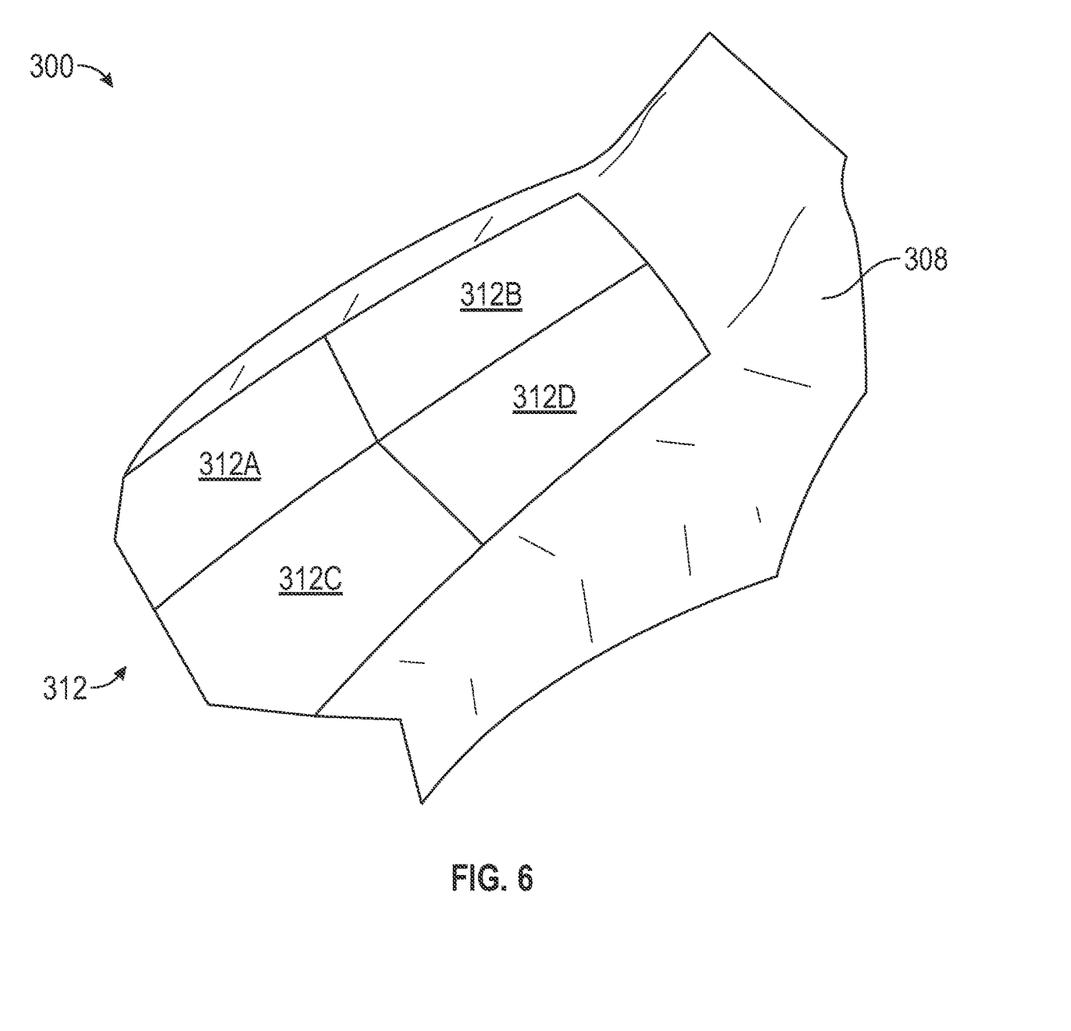
FIG. 6 is a perspective view of the noise mitigation hood of FIG. 5, according to an exemplary embodiment.

As shown in FIG. 6, the noise mitigation hood 300 includes the noise inhibitor housing 308 that is structured to reduce or mitigate the noise escaping the hood compartment horizontally and toward the cab 30, and a noise diffusive panel 312 structured to allow sound to easily pass in a skyward or vertical direction. The noise inhibitor housing 308 may be formed as a single piece, or may include multiple components coupled together. The noise diffusive panel 312 can include a single panel, or may include more than one panel. As shown in FIG. 6, the noise diffusive panel 312 includes a first noise diffusive panel 312A, a second noise diffusive panel 312B, a third noise diffusive panel 312C, and a forth noise diffusive panel 312D. More than four or less than four noise diffusive panels 312 may be includes. In some embodiments, the noise diffusive panels 312A-D include identical or similar noise diffusing structures and/or features. In some embodiments, the noise diffusive panels 312A-D or a subset of the noise diffusive panels 312A-D include different noise diffusing structures and/or features. In some embodiments, it may be advantageous to include a first noise diffusing structure and/or feature on the first noise diffusive panel 312A and a second noise diffusing structure and/or feature on the second noise diffusive panel 312B to better diffuse the noise provided locally below the individual panel. In some embodiments, different noise diffusing structures and/or features may cooperate to more effectively diffuse the noise upward in a cooperative manner. In some embodiments, it may be advantageous that all noise diffusive panels 312 include the same noise diffusing structures and/or features.

Figure 7:
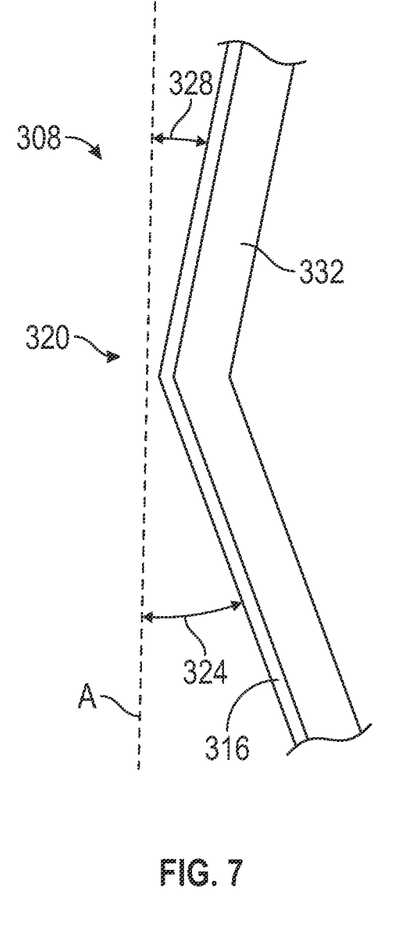
FIG. 7 is a sectional view of a noise inhibitor housing of the noise mitigation hood of FIG. 5, according to an exemplary embodiment.

As shown in FIG. 7, walls 316 of the noise inhibitor housing 308 include noise directive contours 320 structured to provide sound shaping in a vertical direction and internal sound reflection in a horizontal direction. The noise directive contours 320 act to direct noise upward, and inhibit noise from escaping the hood 300 in the horizontal plane (e.g., into the cab 30 or outward from the vehicle 10). In some embodiments, the wall 316 defines a lower portion arranged at vertical expansion angle 324 relative to a vertical axis A that directs low frequency sound generally upward along the axis A. An upper portion of the wall 316 is arranged at a vertical condensing angle 328 relative to the vertical axis A such that the upper portion of the wall 316 directs sound toward the noise diffusive panel 312 and condenses high frequency sound toward a center of the noise diffusive panel 312. In some embodiments, an interior surface of the walls 316 is coated with a noise transmission inhibitor 332. In some embodiments, the noise transmission inhibitor 332 includes a mass loaded vinyl or another vibration inhibitive material that acts as an acoustically reflective barrier adhered to an interior surface of the wall 316 to reduce the transmission of noise through the wall 316. In some embodiments, the noise transmission inhibitor 332 includes an acoustic insulation such as 3M™ Thinsulate™, Dynamat™, stone wool, or another acoustic insulation. In some embodiments, the noise transmission inhibitor 332 includes a combination of a vibration inhibitive material and an acoustic insulation. The contours 320 and/or the noise transmission inhibitor 332 direct noise upward or vertically, and inhibit the horizontal propagation of sound and noise.

Figures 8, 9:
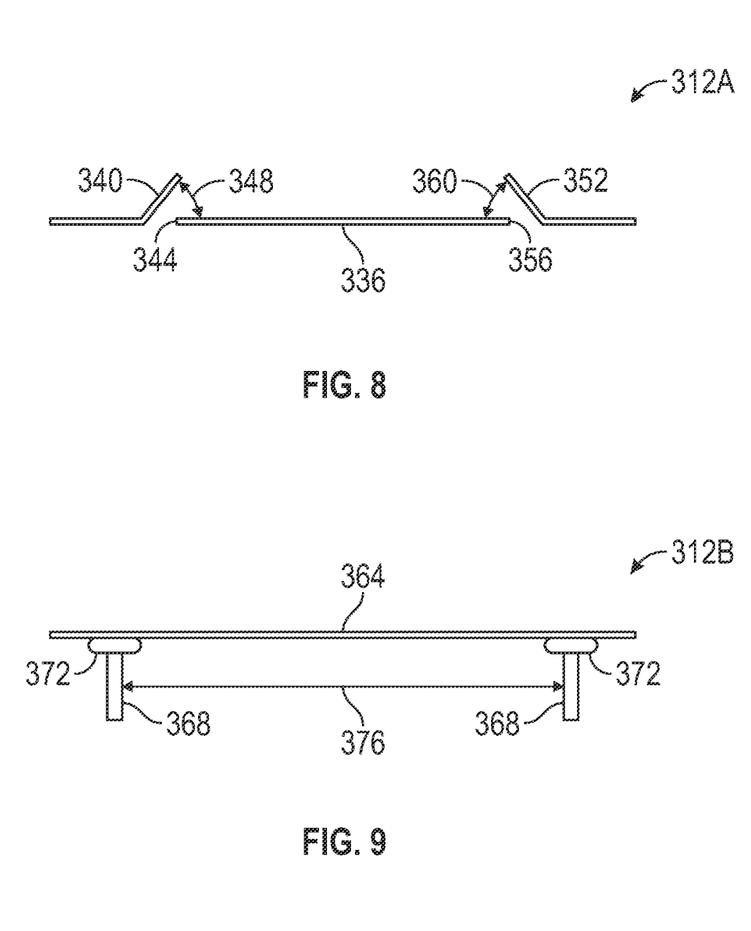
FIG. 8 is a sectional view of a noise diffusive panel of the noise mitigation hood of FIG. 5, according to an exemplary embodiment.
FIG. 9 is a sectional view of a noise diffusive panel of the noise mitigation hood of FIG. 5, according to an exemplary embodiment.

As shown in FIG. 8, the first noise diffusive panel 312A includes a structural deck 336 formed of a solid material such as high temperature plastic or a metal (e.g., aluminum or steel). A first louver 340 is formed in the deck 336 adjacent a first aperture 344 and arranged at a louver angle 348 relative to the deck 336. In some embodiments, the louver angle is forty-five degrees and structured to direct noise upward and toward a center of the vehicle 10. The first aperture 244 is sized to allow the free passage of target frequencies therethrough. A length of the louver 340, the size and shape of the first aperture 344, and the louver angle 348 can be tuned to advantageously receive target frequencies and direct them upward. For example, in machinery with a lower frequency operating characteristic, a relatively larger aperture 344 and longer louver 340 may be desirable. Additionally, the louver angle 348 and the shape of the louver 340 affect the ability of the louver 340 to receive and direct noise vertically. In some embodiments, the louver 340 defines a straight sound profile. In some embodiments, the louver 340 defines a expansion sound profile such as a waveguide profile.

The first noise diffusive panel 312A can also include a second louver 352, a second aperture 356, and define a second louver angle 360 that are substantially the same or different from the first louver 340, the first aperture 344, and the first louver angle 348. The second louver 352, aperture 356, and angle 360 can be tuned differently to cooperate with the first louver 340, aperture 344, and angle 348. In some embodiments, the first louver 340 and the second louver 352 and arranged such that the louver angles 348, 360 direct noise toward each other and frequency based noise cancellation is accomplished via interference from noise exiting the first aperture 344 and the second aperture 356. In some embodiments, the second louver 352, the second aperture 356, and the second louver angle 360 are positioned and structured specifically to cancel frequencies emitted by the first louver 340 and first aperture 344. In some embodiments, more than two louvers are provided and the relative positioning and arrangement of each louver may be different or the same.

As shown in FIG. 9, the second noise diffusive panel 312B includes a skin 364 constructed of a thin and/or low density material. For example, a low density material may be any material less dense than steel. A thin material may be any material that is thinner than the typically employed hood material for a given size or duty of machinery. In some embodiments, the skin 364 is constructed from a highly malleable and acoustically transmissive material such as aluminum or copper of a gauge equal to or less than 24 gauge (i.e., 0.025 inches). In some embodiments, steel can be used at a gauge equal to or less than 30 gauge (i.e., 0.0125 inches). In some embodiments, steel can be used at a gauge equal to or less than 34 gauge (i.e., 0.0082 inches). In some embodiments, a thermoset plastic can be used or another plastic that is high in acoustic transmissivity. In some embodiments, the skin 364 is constructed from a plastic material one millimeter (1 mm) or less in thickness.

A structural support 368 is provided and coupled to the skin 364 via sound deadeners 372. In some embodiments, the structural support, the sound deadeners 372, and the skin 362 are adhered together. In some embodiments, the sound deadeners 368 include mass loaded vinyl or another material with low vibrational transmissivity. The structural support 368 defines a support spacing distance 376 that is sized to inhibit amplification of noise produced within the hood compartment while allowing the free transference of noise through the skin 364 in the vertical direction. The support spacing distance 376 is also sized to cooperate with the skin 364 to provide physical protection of the hood compartment from impacts. For example, the second noise diffusive panel 312B may be structured to deform below a deformation threshold when exposed to a calibration force. For example, the deformation threshold may include a one inch or less deformation when exposed to a calibration force of 5,000 Newtons.

Figure 10:
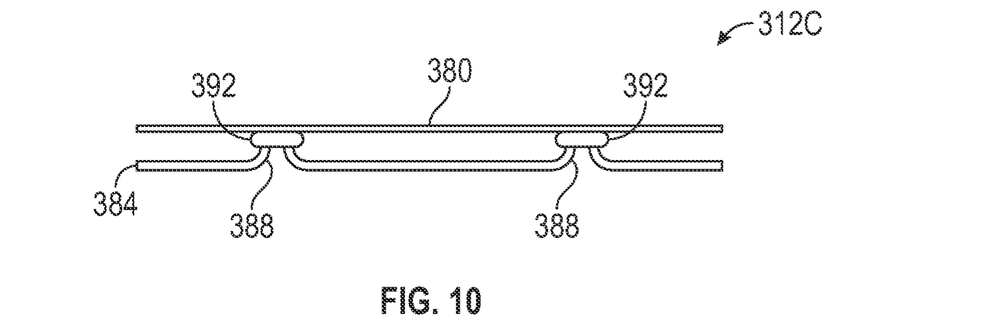
FIG. 10 is a sectional view of a noise diffusive panel of the noise mitigation hood of FIG. 5, according to an exemplary embodiment.
Figure 11:
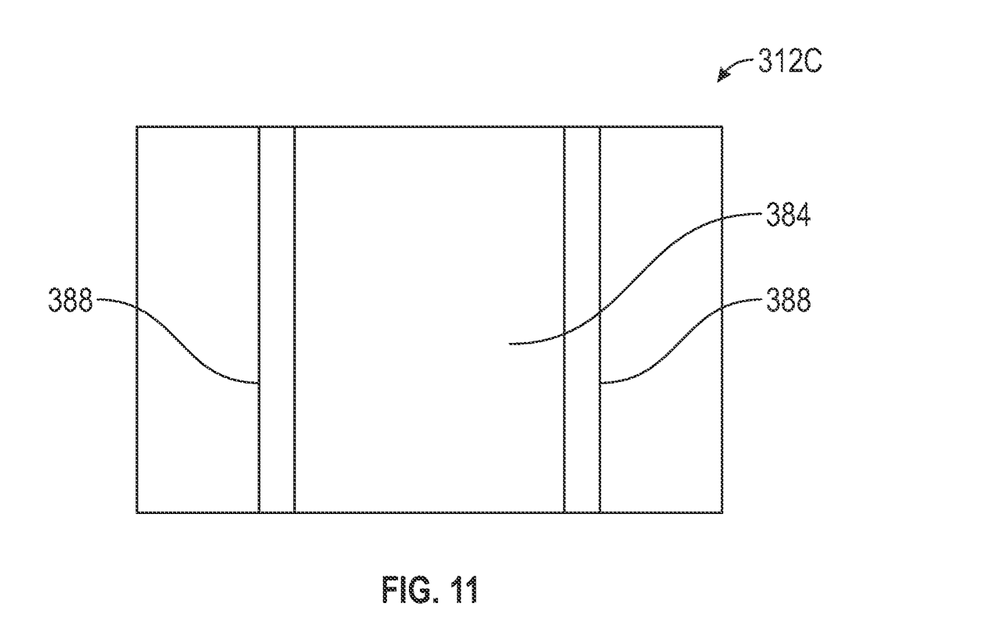
FIG. 11 is a top view of a structural mesh of the noise diffusive panel of FIG. 10, according to an exemplary embodiment.

As shown in FIGS. 10 and 11, the third noise diffusive panel 312C includes a skin 380 similar to the skin 364 of the second noise diffusive panel 312B. A structural mesh 384 is structured to support the skin 380 similar to the structural supports 368 discussed above. The structural mesh 384 includes apertures in the form of perforations equally spaced across the structural mesh 384. In some embodiments, the perforations define an open area of 30% to 70%. For example, the perforation may define a 60 degree stagger, a 45 degree stagger, include round perforations, square perforations, straight line perforations, hexagonal perforations, round slotted perforations, end staggering, side staggering, rectangular perforations, or another type of perforation as desired.

The structural mesh 384 is coupled to the skin 380 via projections 388 formed in the structural mesh 384 and sound deadeners 392. In some embodiments, the projections 388 include bent ribs that extends linearly. In some embodiments, posts or differently shaped bends or stampings may be used. The sound deadeners 392 inhibit the transference of vibrations from the structural mesh 384 to the skin 380.

Figure 12:
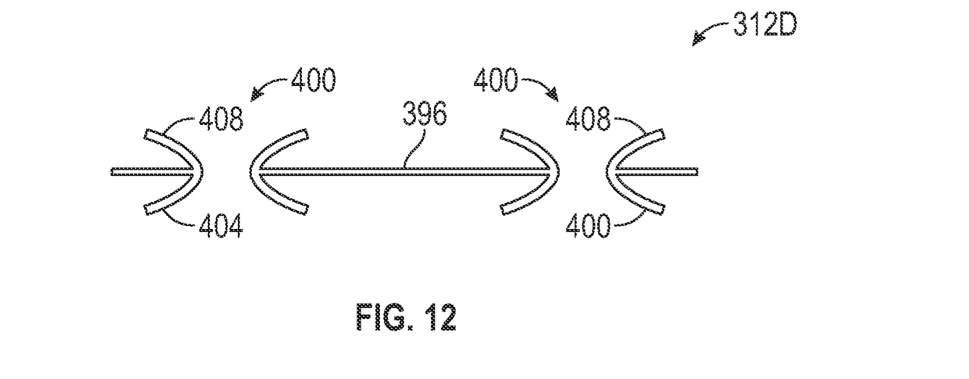
FIG. 12 is a sectional view of a noise diffusive panel of the noise mitigation hood of FIG. 5, according to an exemplary embodiment.

As shown in FIG. 12, the fourth noise diffusive panel 312D includes a skin 396 similar to the skins discussed above and horn elements 400. Each horn element 400 is mounted to the skin 396 and includes a condenser cone 404 and an expansion cone 408. The condenser cone 404 is shaped to receive frequencies from the hood compartment and condense them toward a throat of the horn element 400. The expansion cone 408 is shaped to receive condensed frequencies from the condenser cone 404 and waveform the frequencies directionally upward. In some embodiments, constant directivity geometry, waveguide geometry, quadratic throat waveguide geometry, oblate spheroid waveguide geometry, multiple entry horn geometry, or other horn design concepts may be utilized to selectively direct noise upward.

As discussed above, the hood 300 shown in FIG. 6 can include a single noise diffusive panel 312, multiple noise diffusive panels 312A-D, more or less noise diffuse panels, and the structure of the noise diffusive panels can be a combination of those panels discussed herein or other structures and/or features that allow for selective directivity of noise in a vertical direction while inhibiting the transmission of noise in a horizontal plane. For example, a noise diffusive panel 312 may include a combination of the structural mesh 384 and the skin 380, and horn elements 400. Any other combination of features and/or structures is contemplated within this disclosure.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

It is important to note that the construction and arrangement of the vehicle 10 and the systems and components thereof (e.g., the driveline 50, the braking system 100, the control system 200, the hood 300, etc.) as shown in the various exemplary embodiments is illustrative only. Additionally, any element disclosed in one embodiment may be incorporated or utilized with any other embodiment disclosed herein.

What is claimed is:

1. A hood for a machine, comprising:
 a noise inhibitor housing defining sidewalls that inhibit transmission of noise in a horizontal plane from the machine; and
 a noise diffusive panel supported by a top of the noise inhibitor housing above the sidewalls and structured to release noise upward.

2. The hood of claim 1, wherein the noise inhibitor housing includes noise directive contours structured to provide internal reflection of acoustic frequencies.

3. The hood of claim 2, wherein the noise directive contours include an expansion portion arranged at vertical expansion angle relative to a vertical axis that directs low frequency sound generally upward along the vertical axis A.

4. The hood of claim 2, wherein the noise directive contours include a condensing portion arranged at a vertical condensing angle relative to a vertical axis that directs sound toward the noise diffusive panel and condenses high frequency sound toward a center of the noise diffusive panel.

5. The hood of claim 1, wherein the noise inhibitor housing includes a noise transmission inhibitor structured to absorb noise or inhibit vibration and act as a reflective noise barrier.

6. The hood of claim 1, wherein the noise diffusive panel includes a skin supported by a support structure.

7. The hood of claim 6, wherein the skin includes a plastic equal to or less than one millimeter (1 mm) in thickness.

8. The hood of claim 6, wherein the skin includes an acoustically conductive plastic.

9. The hood of claim 6, wherein the support structure includes a structural mesh.

10. The hood of claim 9, wherein the structural mesh includes perforations sized to encourage acoustic transmittance therethrough.

11. The hood of claim 6, wherein the support structure is coupled to the skin via a sound deadener.

12. The hood of claim 1, wherein the noise diffusive panel includes louvers structured to direct noise vertically upward and to reduce noise propagating in the horizontal plane via acoustic interference.

13. The hood of claim 1, wherein the noise diffusive panel includes horn elements structured to direct noise vertically upward.

14. The hood of claim 1, wherein the hood transmits no more than eighty-five decibels in the horizontal plane.

15. The hood of claim 1, wherein the noise diffusive panel includes a plurality of noise diffusive panels.

16. A noise mitigation hood for a vehicle comprising:
a noise inhibitor housing inhibiting transmission of noise in a horizontal plane into a cab of the vehicle and outward from the vehicle and including noise directive contours structured to provide internal reflection of acoustic frequencies and a noise transmission inhibitor structured to absorb noise or inhibit vibration and act as a reflective noise barrier; and
a noise diffusive panel supported by the noise inhibitor housing, structured to release noise upward, and including a skin supported by a support structure.

17. The noise mitigation hood of claim 16, wherein the skin includes a plastic equal to or less than one millimeter (1 mm) in thickness, and
wherein the support structure includes a structural mesh including perforations sized to encourage acoustic transmittance therethrough.

18. The noise mitigation hood of claim 16, wherein the noise diffusive panel includes louvers structured to direct noise vertically upward and to reduce noise propagating in the horizontal plane via acoustic interference or horn elements structured to direct noise vertically upward.

19. A vehicle comprising:
a frame;
a prime mover supported by the frame;
tractive elements selectively driven by the prime mover;
a cab supported by the frame; and
a noise mitigation hood positioned at least partially above the prime mover and including a noise inhibitor housing inhibiting transmission of noise in a horizontal plane into the cab of the vehicle and outward from the vehicle and including noise directive contours structured to provide internal reflection of acoustic frequencies and a noise transmission inhibitor structured to absorb noise or inhibit vibration and act as a reflective noise barrier, and
a noise diffusive panel supported by the noise inhibitor housing, structured to release noise upward, and including a plastic skin equal to or less than one millimeter (1 mm) in thickness supported by a support structure.

20. The vehicle of claim 19, wherein the noise diffusive panel includes louvers structured to direct noise vertically upward and to reduce noise propagating in the horizontal plane via acoustic interference or horn elements structured to direct noise vertically upward.

* * * * *